United States Patent
Isomura et al.

(10) Patent No.: US 7,288,199 B2
(45) Date of Patent: Oct. 30, 2007

(54) CERAMIC FILTER AND METHOD FOR PURIFYING WATER

(75) Inventors: Manabu Isomura, Nagoya (JP); Tomonori Takahashi, Nagoya (JP); Kenji Mutoh, Nagoya (JP); Minoru Ohta, Nagoya (JP); Makoto Itoh, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 384 days.

(21) Appl. No.: 10/309,321

(22) Filed: Dec. 2, 2002

(65) Prior Publication Data

US 2003/0132174 A1 Jul. 17, 2003

(30) Foreign Application Priority Data

Dec. 7, 2001 (JP) .............................. 2001-374769
Nov. 6, 2002 (JP) .............................. 2002-322032

(51) Int. Cl.
*B01D 63/06* (2006.01)
*B01D 61/14* (2006.01)
*B01D 63/08* (2006.01)
*B01D 24/00* (2006.01)

(52) U.S. Cl. ...................... 210/649; 210/767; 210/723; 210/510.1; 210/459; 210/483; 210/496; 210/650; 210/651; 210/509

(58) Field of Classification Search ................ 210/767, 210/649, 723, 510.1, 459, 483, 496
See application file for complete search history.

(56) References Cited

U.S. PATENT DOCUMENTS

| 510,652 | A | | 12/1893 | Shedd |
|---|---|---|---|---|
| 3,446,742 | A | * | 5/1969 | Bacon ........................ 252/175 |
| 4,971,696 | A | * | 11/1990 | Abe et al. .............. 210/500.25 |
| 4,983,423 | A | * | 1/1991 | Goldsmith ................. 427/230 |
| 5,110,470 | A | * | 5/1992 | Yokosawa et al. ..... 210/500.23 |
| 5,415,775 | A | | 5/1995 | Castillon et al. |
| 5,772,735 | A | * | 6/1998 | Sehgal et al. ................... 95/45 |
| 5,773,103 | A | * | 6/1998 | Ciora, Jr. et al. .......... 428/34.6 |
| 5,830,340 | A | | 11/1998 | Iljitch et al. |

\* cited by examiner

*Primary Examiner*—Krishnan S. Menon
(74) *Attorney, Agent, or Firm*—Burr & Brown

(57) ABSTRACT

A ceramic filter is provided including a substrate, a separation layer comprising titania and having an average pore size in a range of 0.08 to 1 μm and a thickness in a range of 5 to 20 μm, and an intermediate layer formed between the substrate and the separation layer. The intermediate layer includes aggregate particles that are bonded together with glass frits, and aggregate particles of the intermediate layer are smaller than aggregate particles of the substrate and larger than aggregate particles of the separation layer.

3 Claims, No Drawings

CERAMIC FILTER AND METHOD FOR PURIFYING WATER

This application claims the benefit of Japanese Application Nos. 2001-374769, filed Dec. 7, 2001 and 2002-322032, filed Nov. 6, 2002, the entireties of which are incorporated herein by reference.

BACKGROUND OF THE INVENTION AND RELATED ART STATEMENT

The present invention relates to a ceramic filter used for water purification or the like and a method for purifying water using the same.

Ceramic filters have a separation layer, which controls the pore size of the filter, formed on a surface of a substrate formed from a ceramic porous body or a surface of an intermediate layer formed on the substrate. Since such ceramic filters have a high physical strength, endurance, corrosion resistance and the like, they are used for removing suspended matters, bacteria or dust particles from liquid or gas in a wide variety of fields including water treatment, exhaust gas treatment, and medical, pharmacy or food industry field.

A known ceramic filter is formed by bonding alumina particles having a diameter of 12 μm on a support (substrate) made of cordierite with glass frits, bonding alumina particles having a diameter of 1.5 μm thereon with glass frits, firing the product at 1179° C., and to promote self-sintering of alumina particles having a diameter of 0.3 μm at 1179° C. (see U.S. Pat. No. 4,983,423 and U.S. Pat. No. 510,652).

U.S. Pat. No. 5,415,775 also discloses an embodiment of a filter having a support (substrate) and a separation layer formed thereon, the separation layer being made of titania and having a thickness of 25 μm and a pore size of 0.2 μm. However, when serving as a filter for water purification, for example, ceramic filters with an alumina separation layer are inferior to ceramic filters with a titania separation layer in fouling characteristic. To treat raw water with high turbidity, the raw water needs to be subjected to a pretreatment, such as coagulation, before filtration. However, even if fouling is reduced by any pretreatment, the filter with the separation layer of alumina still suffers significant fouling.

As for the filters with a titania separation layer, if the average pore size is below 0.08 μm, or if the film thickness is above 20 μm, a satisfactory fouling characteristic cannot be provided. In water purification, in particular, the filters still suffer significant fouling if dead-end filtration is adopted for the raw water with high turbidity. In addition, if the average pore size of the separation layer is above 1 μm, or if the thickness thereof is below 5 μm, the filter provides inadequate bacteria removal. Furthermore, if the separation layer formed on the intermediate layer is fired without adding any sintering aid to the aggregate particles, or if the intermediate layer is fired with a sintering aid other than glass frit added, the filter has a large maximum pore size and cannot provide high bacteria removal.

The present invention has been devised in view of such circumstances. An object thereof is to provide a ceramic filter having both good fouling characteristics and high bacteria removal capability, and that can be used suitably for water purification or the like, and a method for purifying water using the filter.

SUMMARY OF THE INVENTION

According to a first aspect of the present invention, a ceramic filter is provided, comprising: a separation layer made of titania having an average pore size of 0.08 to 1 μm and a thickness of 5 to 20 μm.

According to a second aspect of the present invention, a ceramic filter is provided, comprising: a substrate, a separation layer, and an intermediate layer formed between the substrate and the separation layer. The intermediate layer comprises aggregate particles that are smaller than aggregate particles forming the substrate and that are larger than the aggregate particles forming the separation layer. The intermediate layer is formed by bonding aggregate particles together with glass frits, and the separation layer is made of titania having an average pore size of 0.08 to 1 μm and a thickness of 5 to 20 μm.

According to a third aspect of the present invention, a method for purifying water is provided, comprising the steps of: providing a ceramic filter comprising a substrate, a separation layer, and an intermediate layer formed between the substrate and the separation layer, the intermediate layer comprising aggregate particles that are smaller than aggregate particles forming the substrate and that are larger than aggregate particles forming the separation layer, wherein the intermediate layer is formed by bonding the aggregate particles together with glass frits, and wherein the separation layer is made of titania having an average pore size of 0.08 to 1 μm and a thickness of 5 to 20 μm, and passing raw water through the ceramic filter.

In the invention, the term "separation layer of titania" indicates a separation layer containing 95% by weight or more of $TiO_2$.

DETAILED DESCRIPTION OF THE INVENTION

A ceramic filter according to a first aspect of the present invention includes a separation layer of titania, which has an average pore size of 0.08 to 1 μm, preferably 0.1 to 0.6 μm, and a thickness of 5 to 20 μm, preferably 10 to 15 μm. Compared to an alumina separation layer or the like, the titania separation layer has a good fouling characteristic, so that it is easy to clean contaminations off the separation layer, and good filtration performance can be maintained for a long time. The ceramic filter according to the present invention is significantly superior to the conventional ceramic filters, in particular, if it is used for water purification applications involving pretreatment of raw water, such as coagulation, or dead-end filtration.

If the average pore size is below 0.08 μm or the thickness is above 20 μm, however, the fouling characteristic deteriorates, or if the average pore size is above 1 μm or the thickness is below 5 μm, the bacteria removal capability deteriorates. Thus, according to the present invention, the average pore size and the thickness of the separation layer are limited to the ranges described above to provide both good fouling characteristic and high bacteria removal capability.

A second aspect of the invention is a preferred embodiment of the present invention, and includes a ceramic filter with a titania separation layer, and which also includes an intermediate layer provided between the substrate and the separation layer. The intermediate layer comprises aggregate particles that are smaller than those of the substrate and larger than those of the separation layer.

The aggregate particles of the intermediate layer are bonded together with glass frits. Forming such an intermediate layer on the porous support substrate and depositing the separation layer on a surface of the intermediate layer provides a filter that is subject to suffering less membrane defects and that has a better bacteria removal capability than those filters having a separation layer deposited directly on a surface of the substrate, or on a surface of an intermediate layer that is fired without adding any sintering aids to the aggregate particles, or that is fired with an added sintering aid other than glass frit.

If the intermediate layer is too thick, the permeability thereof is reduced. Therefore, the thickness thereof is preferably equal to or less than 200 μm. The intermediate layer is formed by filtered-depositing a slurry containing aggregate particles and glass frits on the substrate. The filter can have a further improved bacteria removal capability if the glass frits have an average particle size, in terms of volume definition, equal to or smaller than two-thirds of that of the aggregate particles of the intermediate layer and contains 10% by volume or less of coarse particles having a size equal to or larger than three-seconds of the average particle size of the aggregate particles.

The average particle size of the glass frits is preferably defined as described above because if the average particle size of the glass frits is too large, the amount of the glass frits required for strength development is excessively increased and membrane defects are also increased. The fraction of the coarse particles in the glass frits is preferably defined as described above because if a large number of coarse particles are contained, membrane defects are increased.

A third aspect of the invention is a method for purifying water, in which raw water is passed through the ceramic filter according to the first or second aspects of the invention. By using a filter having both good fouling characteristics and a high bacteria removal capability, as described above, water purification can be conducted adequately for a long time.

In water purification in water works, the raw water to be processed may be filtered without any pretreatment, or may be filtered after a pretreatment, such as coagulation. If the raw water is clear and causes less fouling, it is filtered without a pretreatment in many cases, or if the raw water has a high turbidity, coagulation is to be performed before filtration.

The filtration methods include dead-end filtration and cross-flow filtration. In cross-flow filtration, in which fouling matters are removed by the stream of the raw water, fouling does not tend to occur. However, in the dead-end filtration, fouling matters tend to accumulate, so that fouling occurs easily.

As described above, the titania separation layer has a good fouling characteristic compared to an alumina separation layer. Therefore, the ceramic filter according to the present invention is particularly effective when used for water purification under conditions where fouling is likely to occur, for example, in the case where the raw water has a high turbidity and is passed through the ceramic filter after coagulation, in part or whole, of impurities in the raw water, or where the raw water is passed through the ceramic filter in a dead-end filtration manner.

Now, the present invention will be described in more detail with reference to examples. However, the present invention should not be limited to these examples.

Production of Intermediate Body

Substrate:

A substrate containing alumina as an aggregate and having an average pore size of 20 μm and a membrane area of 0.4 $m^2$ was used. The substrate had an outer diameter of 30 mm and a length of 1000 mm and had 55 holes longitudinally penetrating therethrough. The substrate was immersed in water to impregnate the substrate pores with water. To increase the impregnation rate, the pressure in the container containing the substrate was decreased.

Intermediate Layer Slurry 1:

As an aggregate, alumina particles were obtained by grinding an alumina raw material into pieces having an average particle size of 3 μm with a ball mill. The ground alumina was mixed with water with a water to alumina ratio of 80 to 20. Furthermore, kaolin having an average particle size of 1 μm was added thereto as a sintering aid with an alumina to kaolin ratio of 100 to 10. In addition, a dispersing agent was added in an amount of 1% with respect to the total amount of alumina and kaolin, and Welan gum was added as an organic binder by the percentage of 0.1% to water. In this way, an intermediate layer slurry 1 was prepared.

Intermediate Layer Slurry 2:

As an aggregate, alumina particles were obtained by grinding an alumina raw material into pieces having an average an particle size of 3 μm with a ball mill. Ground glass frits having an average particle size of 1 μm, which is one-third of that of the aggregate particles, were also used. The glass frits contained 90% of particles having a diameter equal to or smaller than the average particle size of the aggregate particles (3 μm). The ground alumina was mixed with water with a water to alumina ratio of 80 to 20. Furthermore, the glass frits were added thereto with an alumina to glass frit ratio of 100 to 14. In addition, a dispersing agent was added in an amount of 1% with respect to the total amount of alumina and glass frit, and Welan gum was added as an organic binder by the percentage of 0.1% to water. In this way, an intermediate layer slurry 2 was prepared.

The particle size distribution was measured with SALD-2000 manufactured by Shimadzu Corporation. A measurement sample used was prepared by adding 1% by weight of a polycarboxylic acid dispersing agent to the powder and diluting the same with water to provide an adequately scattered light intensity. The relative index of refraction of alumina with respect to water was 1.7+0.0i, the relative index of refraction of the glass frit with respect to water was 1.5+0.0i, and the relative index of refraction of titania with respect to water was 2.6+0.0i. The particle size distribution was expressed in terms of volume definition.

Deposition of Intermediate Layer:

The surfaces of the substrate on the inner and outer wall sides were separated, the intermediate slurry was applied to the inner wall side and the pressure on the outer wall side was reduced to a vacuum using a vacuum pump, thereby filtered-depositing an intermediate layer. The thickness of the membrane deposited on the inner wall side was controlled based on the amount of the filtrate on the outer wall side. The intermediate layer was controlled to have a thickness of 150 μm.

Firing the Intermediate Layer:

The intermediate layer slurry deposited on the substrate was fired in an air atmospheric electric furnace. The intermediate layer slurry 1 containing no glass frit was fired at 1400° C. for 5 hours. The intermediate layer slurry 2 containing glass frits was fired at 1000° C. for 5 hours. Hereinafter, the intermediate layer formed from the intermediate layer slurry 1 will be referred to as an intermediate layer 1, and the intermediate layer formed from the intermediate layer slurry 2 will be referred to as an intermediate layer 2.

Production of Separation Layer

Separation Layer Slurry 1:

As an aggregate, alumina particles having an average particle size of 0.3 μm were used. The alumina particles were mixed with water with a water to alumina ratio of 97 to 3. Furthermore, a dispersing agent was added in an amount of 1% with respect to alumina, and Welan gum and PVA were added as organic binders by the percentages of 0.08% and 0.1% to water, respectively. In this way, a separation layer slurry 1 was prepared.

Separation Layer Slurry 2:

As an aggregate, titania particles having an average particle size of 0.5 μm were used. The titania particles were mixed with water with a water to titania ratio of 97 to 3. Furthermore, a dispersing agent was added in an amount of 1% with respect to titania, and Welan gum and PVA were added as organic binders by the percentages of 0.08% and 0.1% to water, respectively. In this way, a separation layer slurry 2 was prepared.

Deposition of Separation Layer:

Membranes of the separation layer slurry 1 and the separation layer slurry 2 were deposited on the intermediate layer described above. The inner and outer wall side surfaces of the substrate having the intermediate layer formed thereon were separated, the slurries were applied to the inner wall side, and the pressure on the outer wall side was reduced to a vacuum using a vacuum pump, thereby filtered-depositing a separation layer. The thickness of the membrane deposited on the inner wall side was controlled based on the amount of the filtrate on the outer wall side.

Firing of Separation Layer:

The separation layer slurry deposited on the intermediate layer was fired in an air atmospheric electric furnace. The separation layer slurry 1 containing the alumina particles as an aggregate was fired at 1300° C. for 5 hours. The separation layer slurry 2 containing the titania particles as an aggregate was fired at 1000° C. for 5 hours. Hereinafter, the separation layer of alumina formed from the separation layer slurry 1 will be referred to as a separation layer 1, and the separation layer of titania formed from the separation layer slurry 2 will be referred to as a separation layer 2.

Sealing of the Substrate:

Both ends of the substrate having the intermediate layer and the separation layer formed thereon were cut off, and then the substrate was sealed at both ends with epoxy resin.

Evaluation of Filter Performance

EXAMPLE 1

In terms of the fouling characteristics, separation layers of different membrane properties were compared with each other. In this comparison, the fouling characteristics were examined for the filter having the separation layer 1 of alumina formed on the intermediate layer 1 and the filter having the separation layer 2 of titania formed on the intermediate layer 1 (the separation layers of both the filters have an average pore size of 0.12 μm and a thickness of 10 μm). The fouling characteristics were evaluated as described below. The results of the evaluation are shown in Table 1. For the filter having the separation layer 2 of titania, the pressure increase per day was about 2 kPa/day or less after 14 days of filtration with a filtration flow rate of $2m^3 \cdot m^{-2} \cdot day^{-1}$. On the other hand, the filter having the separation layer 1 of alumina exhibited a pressure increase that was about twice as high.

Method for Evaluating Fouling Characteristic:

A constant flow rate filtration of river water was conducted in a housing having an inner wall and an outer wall that were separated in which the substrates with the respective membranes were placed. As a pretreatment, depending on the turbidity, 10 to 30 ppm of polyaluminum chloride had been added to the river water for coagulation. The direction of filtration was from the inner wall side to the outer wall side, and the filtration was conducted in the dead-end filtration manner. The filtration flow rate was constant at $2m^3 \cdot m^{-2} \cdot days^{-1}$. Generally, as filtration proceeds, contaminations accumulate on the inner wall surface and the pressure thereon increases. To avoid the pressure increase, a high pressure water of 5 kg/cm² was applied from the outer wall side to the inner wall side and back flushed to clean the contaminations off the membrane every 6 hours. Operation continued for two weeks under these conditions, and a pressure variation during the operation was observed. The pressure increased with the time of operation and decreased after the back flushing. However, even after the back flushing, an initial pressure could not be restored, and the pressure gradually increased. For each of the samples, a difference between pressures at the start of the operation and at the end of the operation was measured every day to determine a pressure increase rate per day, and the pressure increase rates per day of the samples were compared with each other. A membrane having a lower pressure increase rate is less susceptible to contamination and has a better fouling characteristic.

TABLE 1

| INTERMEDIATE LAYER | SEPARATION LAYER | AVERAGE PORE SIZE (μm) | THICKNESS OF SEPARATION LAYER (μm) | FOULING CHARACTERISTIC (kPa/day) |
|---|---|---|---|---|
| INTERMEDIATE LAYER 1 | SEPARATION LAYER 1 (ALUMINA) | 0.12 | 10 | 4.1 |
| | SEPARATION LAYER 2 (TITANIA) | 0.12 | 10 | 2.0 |

EXAMPLE 2

The relationship between the thickness of the titania separation layer and the fouling characteristic and disinfection capability was evaluated. For filters with a separation layer 2 of titania formed on the intermediate layer 2 having a different thickness, the fouling characteristic and the disinfection capability were examined. Evaluation of the bacteria removal capability (bacteria removal performance) was conducted in conformity to AMST-001, the Performance Examination of Membrane Module for Water Supply by Association of Membrane Separation Technology of Japan, and JIS-K3823. The results were as shown in Table 2. It was confirmed that, as for the fouling characteristic, when the thickness of the separation layer of titania was equal to or less than 15 μm, operation was possible with a pressure increase rate equal to or less than 2 kPa/day, if the thickness was more than 20 μm, the pressure increase rate significantly increased and exceeded 3 kPa/day. As for the bacteria removal capability, if the thickness of the separation layer of titania was more than 10 μm, the bacteria removal performance exceeded 5. When the thickness was equal to 5 μm, the bacteria removal performance, which is a reference value, was 4, which is a limit value defined by AMST-001.

EXAMPLE 3

Separation layers 3 to 8 were formed in the same manner as the separation layer 2 using titania particles having different particle sizes from that of the titania particles used for the separation layer slurry 2. For filters having the separation layers 2 to 8, respectively, formed on the intermediate layer 2 (the thickness of any separation layer was 10 μm), the fouling characteristic and the bacteria removal capability were examined. Pore sizes of the separation layers 2 to 8 were measured by an air flow method. Then, the average pore size of the separation layer 2 was 0.12 μm, the average pore size of the separation layer 3 was 0.06 μm, the average pore size of the separation layer 4 was 0.08 μm, the average pore size of the separation layer 5 was 0.22 μm, the average pore size of the separation layer 6 was 0.61 μm, the average pore size of the separation layer 7 was 0.98 μm, and the average pore size of the separation layer 8 was 1.92 μm. The results were as shown in Table 3. As for the fouling characteristic, the filter having the separation layer 3 which has an average pore size smaller than 0.08 μm exhibited more than twice as high as the pressure increase for the filter having the separation layer 2. Besides, the filter having the separation layer 8 which has an average pore size larger than 1 μm exhibited a bacteria removal performance below 4.

TABLE 2

| INTERMEDIATE LAYER | SEPARATION LAYER | AVERAGE PORE SIZE (μm) | THICKNESS OF SEPARATION LAYER (μm) | FOULING CHARACTERISTIC (kPa/day) | BACTERIA REMOVAL PERFORMANCE |
|---|---|---|---|---|---|
| INTERMEDIATE LAYER 2 (BONDED WITH GLASS FRITS) | SEPARATION LAYER 2 (TITANIA) | 0.12 | 5 | 1.6 | 4 |
| | | 0.12 | 10 | 1.8 | 6 |
| | | 0.12 | 15 | 1.9 | 6 |
| | | 0.12 | 20 | 2.3 | 6 |
| | | 0.12 | 25 | 3.1 | 6 |
| | | 0.12 | 30 | 3.5 | 6 |

TABLE 3

| INTERMEDIATE LAYER | SEPARATION LAYER | AVERAGE PORE SIZE (μm) | THICKNESS OF SEPARATION LAYER (μm) | FOULING CHARACTERISTIC (kPa/day) | BACTERIA REMOVAL PERFORMANCE |
|---|---|---|---|---|---|
| INTERMEDIATE LAYER 2 (BONDED WITH GLASS FRITS) | SEPARATION LAYER 2 | 0.12 | 10 | 1.8 | 6 |
| | SEPARATION LAYER 3 | 0.06 | 10 | 5.2 | 6 |
| | SEPARATION LAYER 4 | 0.08 | 10 | 2.2 | 6 |
| | SEPARATION LAYER 5 | 0.22 | 10 | 1.5 | 6 |
| | SEPARATION LAYER 6 | 0.61 | 10 | 1.3 | 6 |
| | SEPARATION LAYER 7 | 0.98 | 10 | 1.2 | 4 |
| | SEPARATION LAYER 8 | 1.92 | 10 | 1.1 | 3 |

EXAMPLE 4

For filters having the separation layer 2 of titania having a thickness of 10 μm formed on the intermediate layer 1 fired at 1400° C. using kaolin as a sintering aid and the intermediate layer 2 containing the aggregate particles bonded with glass frits and fired at 1000° C., respectively, the fouling characteristic and a maximum pore size were measured and the bacteria removal capability was evaluated. The results were as shown in Table 4. Compared to the filter having the separation layer formed on the intermediate layer 1, the filter having the separation layer formed on the intermediate layer 2 had a small maximum pore size and a high disinfection capability. The results show that the combination of the intermediate layer having the aggregate particles bonded with the glass frits and the separation layer of titania provides high bacteria removal capability and good fouling characteristic.

various types of glass frits having an average particle sizes and coarse particle ratios shown in Table 5. Then, the separation layer 2 was formed on the intermediate layers to provide ceramic filters, which were then evaluated in terms of maximum pore size and bacteria removal capability.

The particle size distribution was measured with SALD-2000 manufactured by Shimadzu Corporation. A measurement sample used was prepared by adding 1% by weight of a polycarboxylic acid dispersing agent to the powder and diluting the same with water to provide an adequate scattered light intensity. A relative index of refraction of alumina with respect to water was 1.7+0.0i, a relative index of refraction of the glass frit with respect to water was 1.5+0.0i, and a relative index of refraction of titania with respect to water was 2.6+0.0i. The particle size distribution was expressed in terms of volume definition.

The results were as shown in table 5. If glass frits having an average particle size larger than two-thirds of the average

TABLE 4

| INTERMEDIATE LAYER | SEPARATION LAYER | AVERAGE PORE SIZE (μm) | THICKNESS OF SEPARATION LAYER (μm) | FOULING CHARACTERISTIC (kPa/day) | MAXIMUM PORE SIZE (μm) | BACTERIA REMOVAL PERFORMANCE |
|---|---|---|---|---|---|---|
| INTERMEDIATE LAYER 1 | SEPARATION LAYER 2 | 0.12 | 10 | 2.0 | 3.6 | 4.5 |
| INTERMEDIATE LAYER 2 | SEPARATION LAYER 2 | 0.12 | 10 | 1.8 | 2.2 | 6 |

EXAMPLE 5

Intermediate layers were formed in the same manner as the intermediate layer 2 using, as an aggregate for the intermediate layers, alumina particles obtained by grinding an alumina raw material into pieces having an average particle size of 3 μm with a ball mill, and as glass frits, particle size of the aggregate particles of the intermediate layer are used, or if the volume ratio of coarse particles having a particle size equal to or larger than one-and-a-half (three-seconds) of the average particle size of the aggregate particles is higher than 10%, an increased maximum pore size and a reduced bacteria removal performance are provided.

TABLE 5

| RATIO OF AVERAGE PARTICLE SIZE OF GLASS FRITS TO AGGREGATE PARTICLES | AVERAGE PARTICLE SIZE OF GLASS FRITS (μm) | COARSE PARTICLE RATIO* (%) | MAXIMUM PORE SIZE (μm) | BACTERIA REMOVAL PERFORMANCE |
|---|---|---|---|---|
| 1/1 | 3 | 15 | 3.1 | 5 |
| 2/3 | 2 | 10 | 2.5 | 6 |
| 1/3 | 1 | 1 | 2.2 | 6 |
| 2/3 | 2 | 15 | 3.0 | 5 |
| 2/5 | 2 | 1 | 2.4 | 6 |

*VOLUME RATIO OF GLASS FRITS PARTICLES HAVING PARTICLE SIZE EQUAL TO OR LARGER THAN TWO-THIRDS OF AVERAGE PARTICLE SIZE OF AGGREGATE PARTICLES

As described above, the ceramic filter according to the present invention has both good fouling characteristic and high bacteria removal capability and can be suitably used for water purification or the like. Besides, according to the method for purifying water of the invention, since the ceramic filter having both good fouling characteristic and high bacteria removal capability is used, water purification can be conducted adequately for a long time. The ceramic filter according to the invention is particularly effectively used for water purification under a condition where fouling is easy to occur, for example, in the case where the raw water has a high turbidity and coagulation of part or whole of impurities in the raw water is conducted as a pretreatment before filtration or where the dead-end filtration is adopted.

What is claimed is:

1. A ceramic filter, comprising:
   a substrate;
   a separation layer comprising titania and having an average pore size in a range of 0.08 to 0.61 μm and a thickness in a range of 10 to 20 μm; and
   an intermediate layer formed between said substrate and said separation layer, said intermediate layer comprising aggregate particles bonded together with glass frits, said aggregate particles of said intermediate layer being smaller than an average pore size of said substrate and larger than aggregate particles of said separation layer, and said glass frits having an average particle size, in terms of volume definition, that is equal to or smaller than ⅔ of the average particle size of said aggregate particles of said intermediate layer and containing 10% by volume or less of particles having a size that is equal to or larger than ½ of the average particle size of said aggregate particles of said intermediate layer,
   wherein said ceramic filter has a maximum pore size of 2.5 μm or less, and
   wherein said ceramic filter exhibits a bacteria removal performance of at least 6.

2. A method for purifying raw water, comprising the steps of:
   providing a ceramic filter comprising
      a substrate,
      a separation layer comprising titania and having an average pore size in a range of 0.08 to 0.61 μm and a thickness in a range of 10 to 20 μm, and
      an intermediate layer formed between said substrate and said separation layer, said intermediate layer comprising aggregate particles bonded together with glass frits, said aggregate particles of said intermediate layer being smaller than an average pore size of said substrate and larger than aggregate particles of said separation layer, and said frits having an average particle size, in terms of volume definition, that is equal to or smaller than ⅔ of the average particle size of said aggregate particles of said intermediate layer and containing 10% by volume or less of particles having a size that is equal to or larger than ½ of the average particle size of said aggregate particles of said intermediate layer,
   wherein said ceramic filter has a maximum pore size of 2.5 μm or less, and
   wherein said ceramic filter exhibits a bacteria removal performance of at least 6; and
   passing raw water through said ceramic filter.

3. The method according to claim 2, wherein said raw water is passed through said ceramic filter in a dead-end filtration manner.

* * * * *